United States Patent [19]

Drone

[11] 4,088,209
[45] May 9, 1978

[54] STEERING CLUTCH AND BRAKE CONTROL APPARATUS

[75] Inventor: Gary Alan Drone, Springfield, Ill.

[73] Assignee: Fiat-Allis Construction Machinery, Inc., Deerfield, Ill.

[21] Appl. No.: 739,652

[22] Filed: Nov. 8, 1976

[51] Int. Cl.² .......................................... F16D 67/02
[52] U.S. Cl. ............................. 192/13 R; 192/12 C; 180/6.2
[58] Field of Search ............ 192/13 R, 12 C; 74/478; 180/6.7, 6.2

[56] References Cited

U.S. PATENT DOCUMENTS

| 2,259,794 | 10/1941 | Boldt | 192/13 R |
|---|---|---|---|
| 3,262,525 | 7/1966 | Ehlke et al. | 192/13 R |
| 3,494,449 | 2/1970 | Umeda et al. | 192/13 R |
| 3,797,619 | 3/1974 | Suzuki | 192/13 R |
| 3,815,697 | 6/1974 | Bridwell et al. | 192/13 R |

Primary Examiner—John J. Camby
Assistant Examiner—Henry C. Yuen
Attorney, Agent, or Firm—August E. Roehrig, Jr.; Robert A. Brown; Harvey W. Rockwell

[57] ABSTRACT

Apparatus for controlling steering clutches and independent brakes of a vehicle comprising a steering device responsive to a pair of clutch actuating steering levers for selectively and independently disengaging the clutches for steering purposes. Operation of a single brake pedal and the disengagement of at least one of the clutches selectively and independently engages the vehicles brakes. An inhibiting mechanism coupled to the steering device selectively inhibits either of the vehicle brakes from responding to actuation of the brake pedal when one of the steering levers is actuated to disengage the corresponding clutch, and prevents the opposite brake from being engaged during brake pedal operation. As a result, the vehicle may be steered while employing a pair of steering levers and a single foot pedal. A control system permits the vehicle to be stopped when both steering levers and the single foot pedal are actuated by inactivating the brake inhibiting mechanism.

9 Claims, 1 Drawing Figure

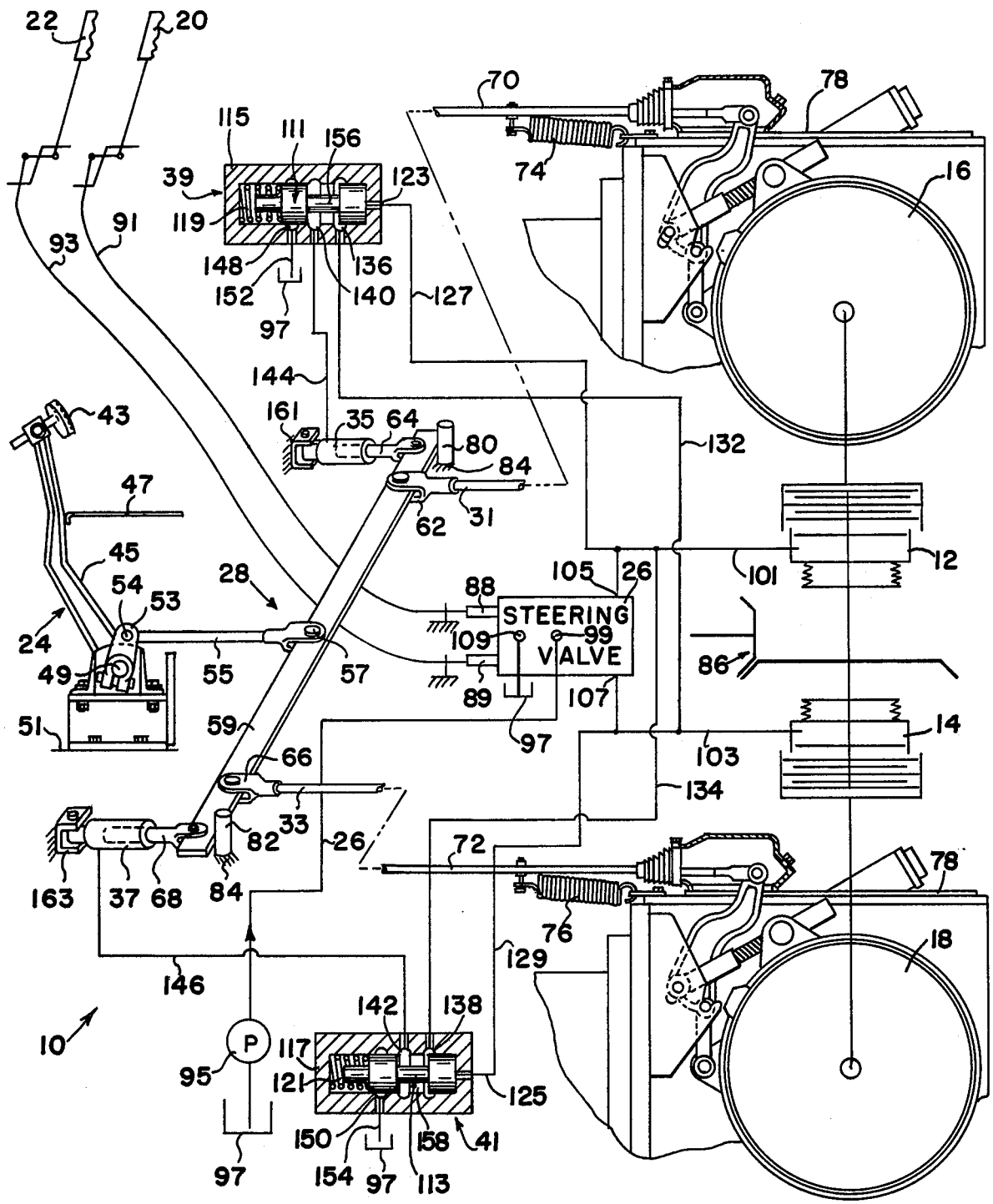

STEERING CLUTCH AND BRAKE CONTROL APPARATUS

BACKGROUND OF THE INVENTION

This invention relates in general to a steering clutch and brake control apparatus.

More specifically, this invention relates to control apparatus for vehicles having a pair of steering clutches and a pair of brakes.

Vehicles, such as track-type tractors and some wheel-type tractors are steered by interrupting the driving power to the sprocket or drive wheel on one side of the vehicle and applying a brake to the selected side. For example, reference may be made to the following U.S. Pat. Nos.: 2,320,320; 2,375,959; 2,390,619; 3,055,445; 3,262,525; 3,460,645, and 3,797,619. Such systems as disclosed in U.S. Pat. Nos. 3,262,525 and 3,797,619, utilize a single control pedal or lever for mechanically coordinating the clutch and brake operation, and a separate pedal for the simultaneous operation of both brakes. Where a plurality of pedals are employed, it is possible to select the wrong pedal during steering or braking of the vehicle, thereby causing improper operation of the vehicle and a safety hazard.

SUMMARY OF THE INVENTION

It is, therefore, an object of this invention to improve steering clutch and brake control apparatus for vehicles.

Another object of this invention is to improve the steering clutch and brake control apparatus for vehicles so that it is simplified in operation, convenient to use, and provides for safer operation of the vehicle.

These and other objects are attained in accordance with the present invention wherein there is provided control apparatus which includes a steering device responsive to a pair of clutch actuating steering levers for selectively and independently disengaging the clutches of the vehicles. A control device responds to at least one of the clutches being disengaged for selectively and independently engaging the brakes. The control device actuates a brake inhibiting system which is connected with the steering device and the vehicle brakes to selectively prevent either brake actuating devices from responding to the foot pedal. As a result, by using a pair of steering levers and a single foot pefal, the vehicle can be steered and stopped in a convenient and simplified manner.

DESCRIPTION OF THE DRAWING

Further objects of the invention, together with additional features contributing thereto and advantages accruing therefrom, will be apparent from the following description of one embodiment of the invention when read in conjunction with the accompanying drawing which is a mechanical schematic of a steering clutch and brake control system for a vehicle constructed in accordance with the present invention.

DESCRIPTION OF THE PREFERRED EMBODIMENT

Referring now to the drawing, ther is shown one embodiment of a steering clutch and brake control apparatus 10, which is constructed in accordance with the present invention. The apparatus 10 is adapted to be used on a vehicle, such as a crawler tractor, having a pair of spring-engaged fluid pressure-released right and left clutches 12 and 14 for conveying power to a set of tracks (not shown), and a pair of right and left brakes 16 and 18 for the tracks on the tractor. A pair of right and left steering levers 20 and 22 are actuable to control the steering of the vehicle as hereinafter described in greater detail. A single foot pedal, generally indicated at 24, actuated with the steering levers 20 and 22 steers and brakes the vehicle as hereinafter described in greater detail. A steering valve 26 is controlled by the movement of the steering levers 20 and 22 to cause the clutches 12 and 14 to be disengaged selectively and independently for steering purposes. A linkage system, generally indicated at 28, includes right and left brake actuating rods 31 and 33 for actuating the respective brakes 16 and 18 in response to the movement of the foot pedal 24. A pair of right and left disabling cylinders 35 and 37, when activated, selectively and individually inhibit either one of the brake actuating rods 31 or 33 from moving when the pedal 24 is actuated. A pair of right and left valves 39 and 41 are controlled by the steering valve 26 to enable or disable the respective associated cylinders 35 and 37 depending upon which of the steering levers 20 or 22 is actuated as hereinafter described in greater detail. In order to stop the vehicle, the operator can actuate both steering levers 20 and 22 to disengage the clutches 12 and 14, and then actuate the foot pedal 24 to engage both brakes 16 and 18 simultaneously, since the valves 39 and 41 are positioned to release fluid from cylinders 35 and 37 to permit both brake actuating rods 31 and 33 to move simultaneously and in unison with one another. When only one of the steering levers 20 and 22 is moved, to turn the vehicle either right to left, the opposite one of cylinder 35 or 37 prevents the actuating rod 31 or 33 associated therewith from moving, so that only the actuating rod associated with the steering lever that is actuated moves to engage its associated brake when the pedal 24 is depressed. During braking of the vehicle under power, depression of the pedal will actuate both brakes 16 and 18.

The foot pedal generally indicated at 24 includes a foot pad 43 mounted on the distal end portion of an arm 45 which extends through the tractor floor plate 47 and is pivotally mounted at 49 on tractor frame 51. A lever arm 53 is pivotally connected at 54 to one end of a connecting rod 55, which is connected pivotally at its opposite end at 57 midway between the ends of a bar 59.

A clevis end 62 of the brake actuating rod 31 is pivotally attached to the bar 59 near one end thereof, and a piston rod 64 of the right cylinder 35 is pivotally attached to the bar at a position between the clevis end 62 and the distal end portion of the bar 59. Similarly, a clevis end 66 of the rod 33 is pivotally attached to the opposite distal end portion of the bar 59, and a piston rod 68 of the cylinder 37 is pivotally attached to the bar 59 at a position between the clevis end 66 and the distal end portion of the bar 59.

The opposite end portions, 70 and 72 respectively, of rods 31 and 33 are connected, respectively, to conventional brakes 16 and 18 to serve as pull rods for actuating the brakes. A pair of bias springs 74 and 76 are coupled between final drive tractor housing 78 and the respective end portions 70 and 72 of the rods 31 and 33 for biasing the brake in a disengaged position. The bar 59 is resiliently biased against a pair of stops 80 and 82, fixed to a tractor housing portion 84, at the distal end portions of the bar 59 opposite the cylinders 35 and 37. Thus, when the pedal 24 is depressed by foot pressure applied to the foot pad 43, the arm 45 rotates in a counterclockwise direction about the pivot point 49. The bar 59 moves to the left, as viewed in the drawing, away from the stops 80 and 82 against the force of the springs 74 and 76. One or both of the end portions of the bar 59 move transversely with the movement of the foot pedal 24 and the connecting rod 55, depending upon whether or not the cylinders 35 and 37 are actuated.

A conventional bevel gear set, schematically shown at 86, transmits power through the normally spring engaged steering clutches 12 and 14 to the appropriate final drive gearing and sprockets (not shown) for driving the vehicle. The brakes 16 and 18 are of a conventional design and are associated with the respective steering clutches 12 and 14 in a conventional manner.

Considering now the manner in which the valves and hydraulic cylinders are arranged, the steering valve 26 is a spool actuated valve constructed in a manner as disclosed in U.S. Pat. No. 3,765,454. The steering valve 26 includes a pair of right and left shiftably mounted spools 88 and 89 which are connected via steering cables 91 and 93 to the respective steering levers 20 and 22 which move the steering cables when pivoted. A pump 95 delivers hydraulic fluid under pressure from a tank, schematically shown at 97, to a port 99 of the valve 26. In order to convey fluid under pressure from the tank 97 to disengage the clutches 12 and 14, a pair of lines 101 and 103 are connected to the clutches 12 and 14 through ports 105 and 107, respectively, of the valve 26. When the lever 20 is actuated to pull the spool 88 outwardly, the port 105 is connected in fluid communication with the port 99 via an internal annular groove (not shown) in the spool 88. Similarly, when the lever 22 pulls the spool 89 outwardly, the port 107 is connected in fluid communication with the port 99 via an internal annular groove (not shown) in the spool 89. The spools 88 and 90 are internally biased inwardly to a neutral position at which fluid entering the port 99 passes through a pressure regular valve (not shown) and is returned to the tank 97 via a port 109. With the spools disposed in their neutral positions, the ports 105 and 107 are connected in fluid communication via passages (not shown) to the port 109 so that the clutches 12 and 14 are at the pressure of the tank 97.

The valves 39 and 41 are also spool type valves which are constructed in accordance with the techniques disclosed in U.S. Pat. No. 3,765,454. The valves 39 and 41 include a pair of spools 111 and 113, respectively, which are slidably mounted within the respective valve bodies 115 and 117. A pair of bias springs 119 and 121 resiliently bias the respective spools 111 and 113 to the right as viewed in the drawing. A pair of ports 123 and 125 of the respective valves 39 and 41 are connected in fluid communication with the respective ports 105 and 107 of the steering valve 26 via the respective lines 127 and 129. When either one of the spools 88 or 89 are pulled outwardly by means of the movement of either one or both of the levers 20 and 22, fluid is supplied to either one or both of the valves 39 and 41 to move the valve spools against the force of their springs in a leftward direction as viewed in the drawing. A pair of cross-connected lines 132 and 134 connect, in fluid communication, the respective ports 107 and 105 of the steering valve 26 with the respective ports 136 and 138 of the valves 39 and 41. Therefore, in the neutral positions of either of the spools 111 or 113, mutually exclusive fluid flow can be established to the valves from the tank 97, via the pump 95 and the valve 26, through the ports 136 or 138 to either of a pair of ports 140 and 142 of the respective valves 39 or 41; via one line of a pair of lines 144 and 146 to the respective cylinders 35 or 37 to selectively activate them to prevent either end of the bar 59 from moving away from its associated adjacent stop. A pair of ports 148 and 150 of the valves 39 and 41 normally blocked when the spools 111 and 113 are in the neutral position, are connected via their respective lines 152 and 154 to the tank 97. When the spools are moved by fluid in either one or both of the lines 127 and 129, the ports 136 and 138 are blocked by the spools, and the ports 140 and 142 are connected in fluid communication by annular grooves 156 and 158 to the respective ports 148 and 150 connecting the cylinders 35 and 37 to the tanks 97, enabling the cylinders to be at the pressure of the tank.

In operation, using for example a right-hand turn by the vehicle, right steering lever 20 is pulled back pivoting about its lower end to move the steering cable 91 pulling the right spool 88 of the steering valve 26 outwardly. As a result, fluid is pumped by pump 95 from the tank 97 to the valve port 99 which at that time is connected in fluid communication via the spool 88 with the port 105. The fluid is then conveyed by the conduit 101 from the port 105 to disengage the right clutch 12. At the same time, fluid is conveyed by the cross-connected conduit 134 to the port 138 of the control valve 41. Since the spool 113 of the valve 41 is disposed in its neutral position, the port 138 is connected in fluid communication with the port 142. Fluid is therefore pumped from the tank 97 through the port 99 of the valve 26 and out port 105 through the line 134 into the port 138 and out of the port 142 to the inhibit cylinder 37 via the line 146. Thus, the left inhibit cylinder 37 is activated to prevent the end portion of bar 59 from moving out from engagement with the stop 82. Therefore the rod 33 is prevented from moving and causing the brake 18 to be engaged.

Fluid also flows from port 105 of the steering valve 26 via line 127 to port 123 of the right valve 39, thereby causing its spool 111 to move against the force of the return spring 119. As a result, port 136 is blocked by the enlarged portion of the spool 111, and the annular recess 156 enables the ports 140 and 148 to be connected in fluid communication. The right inhibit cylinder 35 is then connected in fluid communication with the fluid tank 97 to enable one end of bar 59 to be pulled leftwardly as viewed in the drawing enabling the rod 31 to actuate the right brake 16. Thus, by pulling the lever 20, the right clutch 12 is released, and the right inhibit cylinder 35 is disabled to allow rod 31 to subsequently actuate the right brake 16. Inhibit cylinder 37 is activated to prevent the other end portion of the bar 59 from moving out of engagement with its stop 82, thereby preventing rod 33 from actuating the left brake 18.

When the operator pushes down on the foot pedal 43 to pivot the arm 45 about the pivot point 49, connecting rod 55 is moved in a direction away from the stops 80 and 82 so that the midportion of the bar 59 is also moved with the connecting rod 55. Since the inhibit cylinder 37 is activated and pivotally connected to the tractor frame at 161, as the mid-portion of the bar 59 is moved with the rod 55, the distal end portion of the bar 59 adjacent the stop 82 remains fixed in position. The opposite free end portion of the bar 59 moves away from the stop 80 to cause the piston rod 64 to retract. In this manner, the right brake actuating rod 31 is pulled with the bar 59 against the pressure applied by the spring 74 to engage the right brake 16.

The operator continues to maintain the right clutch 12 disengaged and the right brake 16 engaged until the turn is completed. The operator then releases the steering lever 20 and returns it to its original position, whereby the spring-biased spool 88 returns to its initial neutral position in the steering valve 26. As a result, the ports 105 and 99 are no longer connected in fluid communication and the port 105 is connected by internal passges in the valve 26 to the tank 97. Ports 99 and 109 are now connected in fluid communication causing the pump 95 to return the fluid to the tank 97 by flow and pressure control means in the valve 26.

As a result of closing off port 105 from the pump 95 and connecting it to the tank 97, the pressure in the line 127 drops to permit the return spring 119 to return the spool 111 to its initial position. Fluid no longer flows through the cross-connected line 134 to the port 138 of the valve 41 deactivating the inhibit cylinder 37. Therefore, another cycle of operation may be commenced at this point.

Considering now the operation of the apparatus 10 when it is desired to disengage both clutches and stop the vehicle, upon actuation of both steering lever 20 and 22 spools 88 and 89 of the steering valve 26 are both pulled outwardly disengaging both clutches 12 and 14. Fluid flow through the lines 127 and 129 moves both the spools 111 and 113 axially against the force of their return springs 119 and 121 blocking both of the cross-connected lines 132 and 134 so that the inhibiting cylinders 35 and 37 remain deactivated freeing both ends of the bar 59.

The operator then steps on the foot pad 43 of foot pedal 24 moving the connecting rod 55 and attached bar 59 away from both stops 80 and 82. Thus, both of the brake-actuating rods 31 and 33 move against the force of the respective return springs 74 and 76 to engage both brakes 16 and 18 simultaneously for stopping the vehicle. The steering levers 20 and 22 and the brake pedal 24 are then returned to their initial positions. The return springs 74 and 76 pull the bar 59 against the stops 80 and 82 before disengaging the brakes 16 and 18 and the spools 88 and 89 are returned to their neutral positions within the steering valve 26.

Under certain vehicle operating conditions, such as downhill coast, it is frequently desired to activate the brakes 16 and 18 without disengaging the steering clutches 12 and 14. The present invention provides for this situation by free flow displacement of fluid from the inhibit cylinders 35 and 37 through the pair of lines 144 and 146, the control valves 39 and 41, the lines 127 and 129, ports 107 and 105 and the passages associated with the spools 89 and 88 of valve 26 and the port 109 to the tank 97. The bar 59 is thereby permitted to freely move in response to movement of the pedal 24 to engage the brake 16 and 18.

While the invention has been described with reference to a preferred embodiment, it will be understood by those skilled in the art that many changes and modifications of this invention may be made without departing from the scope thereof. Therefore, it is intended that the invention not be limited to the particular embodiment disclosed as the best mode contemplated for carrying out this invention, but it is intended to cover all such changes, modifications, and embodiments as fall within the scope of the appended claims.

What is claimed is:

1. A vehicle steering clutch and brake control system for a vehicle having independently operable left and right steering clutches and left and right brakes actuated through a single brake pedal comprising
   steering means operatively connected to left and right steering clutches for selectively and independently disengaging said clutches,
   brake actuating means operatively connected to left and right brakes actuable to selectively engage said brakes including a centrally pivotable bar operatively connected to a foot pedal for linear movement in response to operation of said foot pedal, a connecting rod pivotally connected at one end to said bar adjacent each end thereof and at an opposite end to one of said brakes to effect actuation thereof in response to movement of said connecting rod, and stop means supported in a position to be contacted by said centrally pivotable bar upon actuation of said inhibiting means to prevent actuation of the brake connected to the connecting rod associated therewith,
   control means operatively connected to said brake actuating means and said steering means to respond to disengagement of at least one of said steering clutches for effecting selective engagement of said brakes, and
   inhibiting means operatively connected to said steering means and said brake actuating means and actuable by said control means upon the selective independent disengagement of one of said clutches to inhibit the engagement of said brake on the side opposite from said disengaged clutch.

2. The apparatus of claim 1 further including means resiliently biasing said centrally pivotable bar against said stop means to releasably maintain said brakes in a disengaged position.

3. A vehicle steering clutch and brake control system for a vehicle having independently operable left and right steering clutches and left and right brakes actuated through a single brake pedal comprising
   steering means operatively connected to left and right steering clutches for selectively and independently disengaging said clutches, including a valve having a pair of right and left ports connected in fluid communication with the respective right and left clutches for selectively disengaging said clutches, and a pair of cross-connected right and left conduits coupling said right and left ports to the respective left and right inhibiting means such that fluid communication of one of said ports with an associated clutch will actuate the inhibiting means on the side opposite thereto,
   brake actuating means operatively connected to left and right brakes actuable to selectively engage said brakes,
   control means operatively connected to said brake actuating means and said steering means to respond to disengagement of at least one of said steering clutches for effecting selective engagement of said brakes, and
   inhibiting means operatively connected to said steering means and said brake actuating means and actuable by said control means upon the selective independent disengagement of one of said clutches to inhibit the engagement of said brake on the side opposite from said disengaged clutch.

4. The apparatus of claim 3 wherein said inhibiting means includes right and left hydraulically operated cylinders actuable to hold said brake actuating means in a position to selectively prevent engagement of one of said brakes.

5. The apparatus of claim 4 wherein said hydraulically operated inhibiting cylinders are secured at one end and pivotally connected at an opposite end to opposed ends of a centrally pivotable bar operatively connected to a foot pedal for linear movement in response to operation of said foot pedal to mutually and exclusively inhibit movement of an end of said bar upon actuation of one of said inhibiting cylinders.

6. A vehicle steering clutch and brake control system for a vehicle having independently operable left and right steering clutches and left and right brakes actuated through a single brake pedal comprising steering means operatively connected to left and right steering clutches for selectively and independently disengaging said clutches, brake actuating means operatively connected to left and right brakes actuable to selectively engage said brakes, control means operatively connected to said brake actuating means and said steering means to respond to disengagement of at least one of said steering clutches for effecting selective engagement of said brakes, including a valve actuable upon the selective disengagement of one of said clutches to couple said inhibiting means associated with the side opposite said disengaged clutch into fluid communication with a source of hydraulic fluid for inhibiting the engagement of the brake opposite from said disengaged clutch, and inhibiting means operatively connected to said steering means and said brake actuating means and actuable by said control means upon the selective independent disengagement of one of said clutches to inhibit the engagement of said brake on the side opposite from said disengaged clutch.

7. The apparatus of claim 6 wherein said control means includes a valve actuable upon the selective disengagement of one of said clutches to uncouple said inhibiting means associated with said disengaged clutch on the same side of the vehicle from a source of hydraulic fluid thereby disabling said inhibiting means operatively connected to inhibit engagement of the brake on the same side as said disengaged clutch.

8. The apparatus of claim 7 wherein said valve actuable upon the selective disengagement of said clutches uncouples said inhibiting means from a source of hydraulic fluid upon disengagement of both clutches.

9. The apparatus of claim 6 wherein said control means maintains said inhibiting means in a deactivated condition upon the disengagement of both steering clutches to allow actuation of said brake actuating means to simultaneously engage both brakes.

* * * * *